United States Patent [19]

Raynor

[11] 4,278,772
[45] Jul. 14, 1981

[54] SEMI-FLEXIBLE FOAM POLYMER USED IN PACKAGING

[75] Inventor: Robert J. Raynor, North Branford, Conn.

[73] Assignee: Olin Corporation, New Haven, Conn.

[21] Appl. No.: 174,071

[22] Filed: Jul. 31, 1980

[51] Int. Cl.³ .............................................. C08G 18/14
[52] U.S. Cl. ..................................... 521/110; 53/401; 53/473; 264/51; 264/54; 264/DIG. 1
[58] Field of Search ....................... 521/110, 112, 155; 53/401, 473; 264/DIG. 1, 51, 54

[56] References Cited

U.S. PATENT DOCUMENTS

| 3,246,048 | 4/1966 | Haluska | 521/112 |
| 4,087,389 | 5/1978 | Coppola | 220/9 F |
| 4,115,301 | 9/1978 | Kennedy | 521/155 |

*Primary Examiner*—Maurice J. Welsh
*Attorney, Agent, or Firm*—William D. Sabo

[57] ABSTRACT

A select semi-flexible foam polymer composition prepared from a select reaction mixture, the mixture being characterized by a high level of water and an absence of a polyol. The foam polymer composition is particularly useful in packaging fragile or shock-sensitive objects.

19 Claims, No Drawings

SEMI-FLEXIBLE FOAM POLYMER USED IN PACKAGING

This invention relates to the art of packaging fragile or delicate objects, more particularly, to a foam polymer composition substantially free of polyols and to its use in packaging such objects.

Due to their fragile or shock-sensitive nature, numerous articles and materials require special protection when they are packaged for shipping or storage. This includes for example electronic instruments, delicate glassware, fragile antiques, shock-sensitive chemicals and so forth. Various ways and shock-absorbing materials have been taught in the art for packaging such items. A well-known practice is to employ a cellular, shock-absorbing plastic material, such as polystyrene or polyurethane foam, to encapsulate or support the fragile article within the confines of a rigid or semi-rigid box or enclosure. See for example U.S. Pat. Nos. 2,897,641; Re.24,767; 3,190,422; 3,173,535; 3,415,364 and 3,750,871.

Now, according to this invention, a novel semi-flexible foam polymer composition has been found which is particularly suited for such packaging applications. Along with being of very low density and therefore relatively low cost, the foam composition of the invention is characterized by reduced shock transmission properties. This foam polymer composition is prepared from a select reaction mixture which is characterized by a high level of water and an absence of a polyol.

More specifically, the reaction mixture from which the foam of the invention is prepared has an index of about 10 to about 600 and is comprised of the following ingredients:

(a) a polymeric polyisocyanate having an average functionality of about 2.5 to about 3.5;

(b) water in a proportion of about 2 to about 43 parts per every 100 parts by weight of total polyisocyanate in the reaction mixture;

(c) an amine catalyst; and (d) a non-hydrolyzable silicon-based surfactant in a proportion of about 0.5 to about 12 parts per every 100 parts by weight of total polyisocyanate in the reaction mixture.

The term "index" as used throughout the specification and claims herein means a 100 multiple of the over-all ratio of NCO to OH groups in the reaction mixture; and it can be calculated using the formula:

$$\text{Index} = \frac{(9)\ (\text{gm of polyisocyanate})}{(\text{gm of water}) \left( \begin{array}{c} \text{amine equivalent} \\ \text{of polyisocyanate} \end{array} \right)}$$

Surprisingly, it has been discovered that by using the select reaction mixture of the invention, a foam polymer having properties desirable for packaging applications can be made without the use of a polyol. This discovery was unexpected, because the use of a polyol is essential to the formation of urethane polymers, such polymers typically being employed in packaging articles requiring low density cellular materials. Those skilled in the art would expect the reaction of a polymeric polyisocyanate with a high level of water to produce a polymer brittle in nature and lacking adequate mechanical strength and integrity.

According to the method of the invention, the organic isocyanate reactant which is used is a polymeric polyisocyanate. Any such material, as conventionally used in polyurethane foam production, may be employed, including mixtures containing one or more polymeric polyisocyanates. Illustrative such materials are described in U.S. Pat. No. 2,683,730 which issued on July 13, 1954 to Seager et al, and U.S. Pat. No. 3,341,463 which issued on Sept. 12, 1967 to Gemeinhardt. The entire disclosures of these two patents are incorporated herein by reference.

Typical polymeric polyisocyanates are mixtures of polyisocyanates represented by formula I below wherein n is a number from 0 to 5 and R is hydrogen or lower alkyl (i.e., 1–4 carbons):

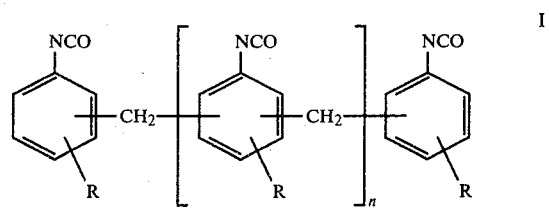

The preferred polymeric isocyanates are the polymethylene polyphenylisocyanates such as can be purchased commercially for use in polyurethane foam production. These are mixtures containing one or more polyisocyanates as represented by formula I above wherein R is hydrogen. Especially preferred polymethylene polyphenylisocyanates are those which have an average NCO functionality ranging from about 2.5 to about 3.5 and still more preferably from 2.5–2.9. It is to be understood that, as used in the specification and claims herein, the terms "polymeric polyisocyanate" and "polymethylene polyphenylisocyanate" are intended to include mixtures containing one or more such polyisocyanates. Further details concerning these compositions and their preparation are provided in the above-noted Seager et al and Gemeinhardt patents.

Such a proportion of the polymeric isocyanate is employed as to provide in the foam-forming reaction mixture an over-all index of from about 10 to about 600, and preferably about 40–80. Typically, the polymeric isocyanate is used in a proportion ranging from about 58 to about 97 parts per every 100 parts by weight of the foam-forming reaction mixture.

The water is employed in a relatively high level, a high level of water being required to contribute to the low density requirements and also to achieve the index specified above and prevent foam shrinkage. Thus water is employed in a proportion ranging from about 2 to about 43, and preferably about 7–16, parts per every 100 parts by weight of total polyisocyanate in the foam-forming reaction mixture.

The foam-forming reaction mixture also includes an amine catalyst or a mixture of such catalysts. Any such material may be used which is an effective catalyst for foam production. Typical are the tertiary amines of which the following are illustrative: trimethylamine, triethylamine, triethylene diamine, tetramethylene diamine, tetramethylbutane diamine, N-methylmorpholine, N-ethylmorpholine, dimethylpiperazine, trimethylaminoethylpiperazine, dimethylcyclohexylamine, bis(dimethylaminoethylether), methyldicyclohexylamine, N-cyclohexylmorpholine, methyldiethanolamine, dimethylethanolamine, trimethylaminoethylethanolamine, and N,N-bis(2-hydroxypropyl)-N',N'-dimethyl- 1,3-propanediamine. The amine is employed in catalytic proportions, i.e., proportions that are sufficient to catalyze the foam-forming reaction. Illustratively, such proportions may vary, depending on the particular catalyst used, from a low of about 0.5 to a high of about 18 parts per every 100 parts by weight of total polyisocyanate in the reaction mixture.

The foam-forming reaction is effected in the presence of a silicon-based surfactant which is necessary in order to prevent the foam from collapsing and further to obtain a foam having a uniform and acceptable cellular structure. For this purpose, any of the conventionally used silicon-based surfactants, such as the silicone oils and the siloxane oxyalkylene block copolymers, may be employed. Generally, however, it is preferred to employ a silicon-based surfactant that is non-hydrolyzable. Such surfactants are characterized by silicon-carbon linkages that are stable in water or water-containing pre-mixes. This stability is predicated on the absence of Si—O—C bonds in the molecule. Representative such surfactants are the non-hydrolyzable silicon-glycol copolymers which are described in the *Journal of Cellular Plastics*, March/April, 1973 issue, pp. 99–102; and the siloxane-polyether urethane copolymers, described in U.S. Pat. No. 3,246,048 which issued on Apr. 12, 1966 to Haluska. The entire disclosures of both these references are incorporated herein by reference.

The silicon-based surfactant is preferably employed in a proportion from about 0.5 to about 12 parts per every 100 parts by weight of total polyisocyanate in the reaction mixture. This is in order to prevent the foam from collapsing, when too little surfactant is used, and also to avoid foam shrinkage when too high a level of the surfactant is used. A more preferred surfactant level is about 1–7 parts per 100 parts by weight of total polyisocyanate in the reaction mixture.

The foam-forming mixture of the invention is particularly suited for the on-site generation of foam by means of portable foaming apparatus. Illustrative such apparatus are disclosed in U.S. Pat. No. 3,769,232, which issued on Oct. 30, 1973 to Houldridge, and U.S. Pat. No. 3,541,023, which issued on Nov. 17, 1970 to Cole. The entire disclosure of both these patents are incorporated herein by reference.

While consisting essentially of the above-described ingredients, the foam-forming reaction mixture may include other additives which serve a certain function or impart certain properties to the foam. This includes for example colorants, flame retardant additives and so forth.

Foams prepared according to the invention are semi-flexible and substantially open-cell. They are further characterized by a combination of very low density, e.g., 0.3–2, and preferably 0.3–0.5, pounds per cubic foot, and low shock-transmission properties as determined by the test described in ASTM-D-1596. As such, the foams of the invention are highly suitable, from a practical and economic standpoint, for use in packaging fragile or shock-sensitive articles and materials.

In utilizing these foams for packaging fragile articles pursuant to the method of the invention, any suitable prior art technique may be used. For example, the fragile article may first be placed or suspended inside a cardboard or wooden box, and the space between the article and the interior walls of the box then filled with the foam. Another technique is to prepare pre-molded sections of foam which are then used to enclose the fragile article. Various other methods of packaging may be used as described or practiced in the art. Thus the improved foam formulation disclosed herein may be used in the practice of any prior art method for packaging fragile articles.

The following examples are provided to illustrate the invention. Further in the examples, all parts are by weight based on 100 parts by weight of total polyisocyanate in the reaction mixture.

EXAMPLES 1–3

Semi-flexible foam polymers were prepared from reaction mixtures utilizing the ingredients and proportions as outlined in Table I. In each example, the ingredients were hand-mixed and foamed in a square cardboard box. Foam products were obtained and were observed for shrinkage or collapse during room temperature curing; and the core density for each product was measured.

In each example, the foaming reaction took place instantly and was completed shortly thereafter. Uniform, substantially open-cell semi-flexible cellular products which exhibited no collapse or shrinkage were obtained.

In example 2, the product was further tested in accordance with the procedure in ASTM-D-1596. The results, which are summarized in Table II, show that the foam polymer had excellent shock absorbing characteristics, particularly for use with fragile or light objects.

TABLE I

| | Parts by Weight | | |
|---|---|---|---|
| | Example 1 | Example 2 | Example 3 |
| Polymethylene polyphenylisocyanate[1] | 100.00 | 100.00 | 100.00 |
| Dow Corning® 191 surfactant[2] | 5.27 | 4.17 | 6.35 |
| N,N-bis(2,hydroxypropyl)-N',N'-dimethyl-1,3-propanediamine catalyst[3] | 3.68 | — | 4.45 |
| Amine catalyst[4] | 1.57 | — | 1.90 |
| Trimethylaminoethylethanolamine catalyst[5] | — | 2.73 | — |
| Water | 10.53 | 12.89 | 33.67 |
| Index | (63) | (52) | (20) |
| Density, core, p.c.f. | 0.38 | 0.35 | 0.57 |
| Shrinkage | No | No | No |

[1]This is a commercial product of Uniroyal Chemical Div. of Uniroyal Inc. purchased under the trademark "Ruminate-m" and having an approximate functionality of 2.7.
[2]This is a silicone-glycol copolymer described in a 1977 Dow Corning bulletin, No. 22-476-77.
[3]This is a commercial product of Jefferson Chemical Co. purchased under the trademark "Thancat DPA".
[4]This is a commercial product of Union Carbide purchased under the trademark "Niax A-5" and described in a September, 1976 Union Carbide bulletin, No. F-45689.
[5]This is a product of Abbott Laboratories purchased under the trademark "Polycat-15".

TABLE II

| SHOCK ABSORBING CHARACTERISTICS | |
|---|---|
| Static Stress, psi | Peak Accerleration, G's |
| 0.1 | 18.33 |
| 0.2 | 15.56 |
| 0.4 | 12.50 |
| 0.6 | 9.86 |
| 0.8 | 9.03 |
| 1.0 | 10.10 |

Note:
[1]The test sample utilized had a thickness of 2 inches.
[2]In the testing, a drop of 30 inches was performed.

COMPARATIVE EXAMPLES 1 AND 2

These comparative examples are provided to demonstrate the criticality of the high water content in making the foam polymers of the invention. In both comparative examples, the procedure of Examples 1-3 was followed, except that the reaction mixtures utilized the ingredients and proportions as outlined in Table III.

In each example, a foaming reaction did take place; however, the products were not acceptable. The product of Comparative Example 1 had a foam core which was rigid, and very brittle, and which displayed an irregular cellular structure. The product of Comparative Example 2 had a foam core which had an irregular cellular structure, lacked mechanical strength and contained an excessive amount of water.

TABLE III

| | Parts by Weight | |
|---|---|---|
| | Comparative Example 1 | Comparative Example 2 |
| Polymethylene polyphenylisocyanate[1] | 100.00 | 100.00 |
| Dow Corning® 191 surfactant[2] | 3.71 | 6.35 |
| Trimethylaminoethanolamine catalyst[3] | 1.86 | 3.18 |
| Water | 1.07 | 73.02 |
| Index | (625) | (9) |
| Density, core, p.c.f. | 2.03 | — |
| Cellular Structure | Non-Uniform | Non-Uniform |

[1]This is a commercial product of Uniroyal Chemical Div. of Uniroyal Inc. purchased under the trademark "Ruminate-m" and having an approximate functionality of 2.7.
[2]This is a silicone-glycol copolymer described in a 1977 Dow Corning bulletin, No. 22-476-77.
[3]This is a commerical product of Air Products and Chemicals Inc. purchased under the Trademark "Dabco-t".

EXAMPLES 4 and 5

Semi-flexible foam polymers were prepared from reaction mixtures utilizing the ingredients and proportions as outlined in Table IV. In each example, the ingredients were hand-mixed and foamed in a square cardboard box. Foam products were obtained and were observed for shrinkage or collapse during room temperature curing; and the core density for each product was measured.

In each example, the foaming reaction took place instantly and was completed shortly thereafter. Uniform, substantially open-cell semi-flexible cellular products which exhibited no collapse or shrinkage were obtained.

TABLE IV

| | Parts by Weight | |
|---|---|---|
| | Example 4 | Example 5 |
| Polymethylene polyphenylisocyanate | 100.00[1] | 100.00[2] |
| Dow Corning® 191 surfactant[3] | 5.27 | 5.27 |
| N,N-bis(2,hydroxypropyl)-N',N'-dimethyl-1,3-propanediamine catalyst[4] | 3.68 | 3.68 |
| Amine catalyst[5] | 1.57 | 1.57 |
| Water | 10.53 | 10.53 |
| Index | (63) | (61) |
| Density, core, p.c.f. | 0.38 | 0.44 |
| Shrinkage | No | No |

[1]This is a commercial product of Upjohn Company purchased under the trademark "PAPI 135" and having an approximate functionality of 2.7.
[2]This is a commercial product of Upjohn Company purchased under the trademark "PAPT 580" and having an approximate functionality of 3.0.
[3]This is a silicone-glycol copolymer described in a 1977 Dow Corning bulletin, No. 22-476-77.
[4]This is a commercial product of Jefferson Chemical Co. purchased under the trademark "Thancat DPA".
[5]This is a commercial product of Union Carbide purchased under the trademark "Niax A-5" and described in a September, 1976 Union Carbide bulletin, No. F-45689.

COMPARATIVE EXAMPLE 3

This comparative example is provided to demonstrate the criticality of the polymer polyisocyanate reactant used in preparing the foam polymers of the invention. In the comparative example, the procedure of Examples 4 and 5 was followed, except that the reaction mixture utilized the following ingredients and proportions:

| Ingredients | Parts by Weight |
|---|---|
| Polymethylene polyphenylisocyanate[1] | 100.00 |
| Dow Corning® 191 surfactant[2] | 5.27 |
| N,N-bis(2,hydroxypropyl)-N',N'-dimethyl-1,3-propanediamine catalyst[3] | 3.68 |
| Amine catalyst[4] | 1.57 |
| Water | 10.53 |
| Index | (63) |

[1]This is a commercial product of Upjohn Company purchased under the trademark "PAPI 901" and having an approximate functionality of 2.3.
[2]This is a silicone-glycol copolymer described in a 1977 Dow Corning bulletin, No. 22-476-77.
[3]This is a commercial product of Jefferson Chemical Co. purchased under the trademark "Thancat DPA".
[4]This is a commercial product of Union Carbide purchased under the trademark "Niax A-5" and described in a September, 1976 Union Carbide bulletin, No. F-45689.

In the example, a foaming reaction did take place; however, the product was an unacceptable distorted mass exhibiting substantial collapse.

What is claimed is:

1. A semi-flexible foam polymer having a density of from about 0.3 to about 2 pounds per cubic foot, said polymer being prepared from a reaction mixture having an over-all index of about 10 to about 600, wherein said reaction mixture comprises:
    (a) a polymeric polyisocyanate having an average functionality of about 2.5 to about 3.5;
    (b) water in a proportion of about 2 to about 43 parts per every 100 parts by weight of total polyisocyanate in said reaction mixture;
    (c) an amine catalyst; and
    (d) a non-hydrolyzable silicon-based surfactant in a proportion of about 0.5 to about 12 parts per every 100 parts by weight of total polyisocyanate in said reaction mixture; and
wherein said reaction mixture is substantially free of a polyol.

2. The semi-flexible foam polymer as recited in claim 1, wherein said polymeric polyisocyanate is polymethylene polyphenylisocyanate.

3. The semi-flexible foam polymer as recited in claim 2, wherein said amine catalyst is a tertiary amine.

4. The semi-flexible foam polymer as recited in claim 3, wherein per every 100 parts by weight of total polyisocyanate in said reaction mixture, there are employed:

(a) about 7 to about 16 parts of said water; and
(b) about 1 to about 7 parts of said silicon-based surfactant.

5. The semi-flexible foam polymer as recited in claim 4, wherein said index ranges from about 40 to about 80 and said polymethylene polyphenylisocyanate has an average functionality of about 2.5 to about 2.9.

6. The semi-flexible foam polymer as recited in claim 5, wherein said polymer has a density of from about 0.3 to about 0.5 pounds per cubic foot, and further wherein per every 100 parts by weight of said reaction mixture, there is employed about 58 to about 97 parts of said polymethylene polyphenylisocyanate.

7. The semi-flexible foam polymer as recited in claim 6, wherein per every 100 parts by weight of total polyisocyanate in said reaction mixture, there is employed about 0.5 to about 18 parts of said tertiary amine catalyst.

8. In a method for packaging fragile articles with a cellular, shock-absorbing material, the improvement of using as said cellular material the foam polymer as recited in claim 1.

9. In a method for packaging fragile articles with a cellular, shock-absorbing material, the improvement of using as said cellular material the foam polymer as recited in claim 4.

10. In a method for packaging fragile articles with a cellular, shock-absorbing material, the improvement of using as said cellular material the foam polymer as recited in claim 7.

* * * * *